US012076616B2

(12) United States Patent
Yarbrough (10) Patent No.: US 12,076,616 B2
(45) Date of Patent: Sep. 3, 2024

(54) SPORTS SWING TRACKING SYSTEM (71) Applicant: Glen Yarbrough, College Grove, TN (US)

(72) Inventor: Glen Yarbrough, College Grove, TN (US)

(*) Notice: Subject to any disclaimer, the term of this patent is extended or adjusted under 35 U.S.C. 154(b) by 156 days.

(21) Appl. No.: 17/878,086

(22) Filed: Aug. 1, 2022

(65) Prior Publication Data
US 2023/0110035 A1 Apr. 13, 2023

Related U.S. Application Data (60) Provisional application No. 63/231,278, filed on Aug. 10, 2021.

(51) Int. Cl.
*A63B 69/36* (2006.01)
*A63B 24/00* (2006.01)
(Continued)

(52) U.S. Cl.
CPC ...... *A63B 24/0003* (2013.01); *A63B 71/0622* (2013.01); *G06T 7/246* (2017.01); *G06T 7/60* (2013.01); *G06T 7/73* (2017.01); *H04N 23/695* (2023.01); *A63B 69/0002* (2013.01); *A63B 69/3623* (2013.01); *A63B 2071/0647* (2013.01); *A63B 2220/05* (2013.01); *A63B 2220/20* (2013.01); *A63B 2220/806* (2013.01); *G06T 2207/10016* (2013.01); *G06T 2207/30196* (2013.01); *G06T 2207/30224* (2013.01)

(58) Field of Classification Search
CPC ............ A63B 24/0003; A63B 71/0622; A63B 69/0002; A63B 69/3623; A63B 2071/0647; A63B 2220/05; A63B 2220/20; A63B 2220/806; G06T 7/246; G06T 7/60; G06T 7/73; G06T 2207/10016; G06T 2207/30196; G06T 2207/30224; G06T 2207/30221; G06T 7/50; G06T 7/62; H04N 23/695; H04N 23/90
USPC ......................................... 473/219–223, 257
See application file for complete search history.

(56) References Cited

U.S. PATENT DOCUMENTS 5,111,410 A * 5/1992 Nakayama ........... A61B 5/1127
348/157
7,857,708 B2 * 12/2010 Ueda .................. A63B 24/0003
473/131

(Continued)

*Primary Examiner* — Nini F Legesse
(74) *Attorney, Agent, or Firm* — Jose W. Jimenez; Robert Cantrell; JIMENEZ LAW FIRM (57) ABSTRACT

A sports swing tracking system that has at least one computer processor, a camera system with a digital image sensor, the camera system operating at or greater than sixty frames per second at an exposure rate faster than one one-thousandth of a second. The sports swing tracking system also includes a distance calculating system designed to calculate the distance to an object of known size determined by a pixel array corresponding to the equivalent dimensions of the imaged object. The sports swing tracking system also includes a body frame pose estimator system designed to calculate the distance between each of thirteen or more body frame points and a motion mapping system designed to calculate changes in the three-dimensional location and attitude of at least one or more of the thirteen or more body frame points, an at least one ball point, and two or more points representing a sports instrument.

4 Claims, 10 Drawing Sheets

(51) Int. Cl.
*A63B 71/06* (2006.01)
*G06T 7/246* (2017.01)
*G06T 7/60* (2017.01)
*G06T 7/73* (2017.01)
*H04N 23/695* (2023.01)
*A63B 69/00* (2006.01)

(56) References Cited

U.S. PATENT DOCUMENTS

| | | | | |
|---|---|---|---|---|
| 8,335,345 | B2* | 12/2012 | White | A63B 24/0021 |
| | | | | 348/169 |
| 2006/0247070 | A1* | 11/2006 | Funk | A63B 69/3623 |
| | | | | 473/222 |
| 2010/0281432 | A1* | 11/2010 | Geisner | G06F 3/011 |
| | | | | 715/849 |
| 2013/0005495 | A1* | 1/2013 | Saito | G01P 3/38 |
| | | | | 473/223 |
| 2013/0143682 | A1* | 6/2013 | Ueda | A63B 24/0003 |
| | | | | 473/409 |
| 2015/0072797 | A1* | 3/2015 | Sakyo | A63B 69/3632 |
| | | | | 473/223 |

\* cited by examiner

SPORTS SWING TRACKING SYSTEM

CLAIM OF PRIORITY

This application claims the benefit of and priority to U.S. Provisional application with Ser. No. 63/231,278, filed on Aug. 10, 2021, with the same title, which is hereby incorporated by reference in its entirety.

FIELD OF THE INVENTION

The inventive concept relates generally to a sports swing tracking system for training a sports player.

BACKGROUND

Currently, there are a number of solutions for training sports players. Golf provides an illustration. In the past, a golfer or coach would record a video of the player for training and advance frame by frame through the video to assess player performance. The golfer or coach would use markup technology to sketch reference lines on the video images, approximated visually, for use in the assessment. The task to do this analysis frame by frame can be laborious and limits the number of references a coach, player, or other person can create within time and other constraints. Also, the approximation would often be inaccurate. Such systems may depend mostly on the skills of the player or coach to review the system manually, the player or coach unaided by computerized evaluations.

Professional athletes have been better able to use computer-generated analytic results, having the skills to know what to do with analytic information or hiring a coach skilled at interpreting the results and applying the results to training. The best way to take advantage of superior performance analytics is with a coach, but both the coach and the analytical tools may be too sophisticated and correspondingly expensive to benefit the average user. Therefore, there currently exists a need in the market for a superior sports analytical tool optimized to improve the performance of the average sports player.

SUMMARY OF THE INVENTION

The disclosed inventive concept is a system that takes uploaded video image frames of a sports player and uses an artificial intelligence learning system to track key points on the sport's players body and, in the case of a sport that uses an object to swing, such as a bat or golf club, key points on that device during the swing. The inventive concept involves capturing the data efficiently and effectively for use by a selected artificial intelligence learning system. The inventive concept is designed to deliver frame by frame comparison measurements of those key points. In addition, the system provides both static and dynamic lines that are displayed on the playback screen so that the player or coach can compare frame by frame movement to movement illustrated by those lines. For example, a golfer or golf coach may find a vertical static line useful for determining if the sports player is leaning too far back when executing a backswing. For another example, the inventive concept may utilize static lines that depict a proper swing plane. The high and low extreme swing plane lines are set and kept static throughout the swing. When the representative golfer swings the club, the static lines offer a useful visual reference to illustrate the position of the club shaft and clubhead throughout the swing and aid in determining if the club shaft and clubhead are within the tolerances of the static swing plane lines. Substantially the same analysis would be performed for other sports with measurements specific to the sought actions.

The inventive concept may further use dynamic and static measurements and compare them to a set of standard criteria that are provided by an expert in the field, such as a golf pro or baseball coach. The inventive concept will then provide automated tips in the form of text and links to videos as to what problems a given user has when executing the assessed action and how to correct those problems.

The preferred embodiment is a sports swing tracking system that has at least one computer processor operable with a memory storage medium. Included in the swing tracking system is a camera system that has at least one convergent lens and at least one digital image sensor, the camera system operably coupled to the at least one computer processor, the camera system operating at or greater than sixty frames per second at an exposure rate, sometimes known as shutter speed, of at or faster than one one-thousandth of a second.

The sports swing tracking system also includes a distance calculating program of the at least one computer system that is designed to calculate the distance to an object of known size from the camera system substantially when imaging the object, the calculation determine from at least one or more of a single row of pixels arrayed horizontally to determine width and a single row of pixels arrayed vertically to determine height corresponding to the equivalent dimensions of the imaged object of known size.

The sports swing tracking system also includes a body frame pose estimator program of the at least one computer system that has thirteen or more body frame points detectable by at least one or more of offset vector calculations and keypoint heatmapping. This body frame pose estimator system is designed to calculate the distance between each of the thirteen or more body frame points from a pixel measurement value determined by the distance to the object of known size, the object of known size being within a useful proximity of the body frame points, useful proximity defined as a distance in which a person represented by the body frame points can physically interact with the object of known size, the body frame pose estimator system further designed to perform three-dimensional calculations from the thirteen or more body frame points from which to estimate both location and point attitude.

The sports swing tracking system also includes a motion mapping program of the at least one computer system designed to calculate changes in the three-dimensional location and attitude of at least one or more of the thirteen or more body frame points, an at least one ball point representing a ball, and two or more rod points representing at least one or more from a group of: bat, club, racket, stick, blade, paddle, foil, or other sports instrument having a handle portion and at least one or more of a striking, throwing, and catching portion, the motion mapping program further calculating changes in point locations in three-dimensional space from two or more frames of known interval and further deriving the rate of point location change between known intervals from which to calculate speed and direction along the timeline between each frame of the two or more frames of known interval, the calculations including the location, speed, and direction at each selected derivative of time of the points in at least one or more of a defined three-dimensional space and three dimensional space relative to the other points.

In one embodiment of the sports swing tracking system, the distance calculating program is designed to refine distance calculations based on the angle of each point from the camera system wherein the maximum distance adjustment and minimum distance adjustment is determined by the height of the camera system and the height of the object of known size, the height measured from a common horizontal plane.

In one embodiment of the sports swing tracking system, the distance calculating program operates from a default setting of the camera system being at substantially five feet and nine inches above the common horizontal plane, the height setting of the camera system being adjustable by a user. In one embodiment of the sports swing tracking system, the distance calculating program includes at least one or more from a group of: a trigonometry-based optical distance measurement system, a laser-based measurement system, a sonar-based measurement system, and a GPS measurement system.

The inventive concept is portable and compact, portable and compact defined as an item a user can carry unaided within an item such as a typical backpack. Other items such as a stand or tripod camera holder may be used, or the inventive concept may be hand-held by a user or otherwise born on the user's body. The object of known size may be the ball used for training or may be another object.

Artificial intelligence within the inventive concept delivers measurements of key points in many different situations and instances. A unique aspect of the inventive concept is that the user receives the capability to see a quick reference to set lines on a screen that are set at a specific instance in the video. In the case of a golf swing, the address position is a key reference point used as a benchmark for comparing the rest of the swing. When the golfer sets up in preparation to swing the club to impact the ball, the system sets static lines in which the rest of the body and club motions are compared.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Referring now to FIGS. 1-8, there is illustrates a representative sports swing tracking system 10 that has at least one computer processor 600 operable with a memory storage medium 630. Included in the swing tracking system 10 is a camera system 100 that has at least one convergent lens 110 and at least one digital image sensor 120, the camera system 100 operably coupled to the at least one computer processor 600, the camera system 100 operating at or greater than sixty frames per second at an exposure rate of at or faster than one one-thousandth of a second.

FIGS. 1-8B further illustrates the sports swing tracking system 10 also includes a distance calculating system 130 of the at least one computer system 600 that is designed to calculate the distance to an object of known size 200 from the camera system 100 substantially when imaging the object 200, the calculation determine from at least one or more of a single row of pixels 300 arrayed horizontally to determine width and a single row of pixels 300 arrayed vertically to determine height corresponding to the equivalent dimensions of the imaged object of known size 200. The suggested distance for imaging the object of known size 200 is substantially about nine feet or about three meters and even where a user seeks to image from this suggested distance, distance calculation is refined by the inventive concept.

FIGS. 1-8B further illustrate a representative calculation that the inventive concept uses, a series of Euclidian calculations or the equivalent to determine distances from the object of known size 200. The object of known size 200, such as a ball, when imaged by the camera system 100 through the converging lens 110, the converging lens 110 being substantially non-distorting, creates a digital representation of that object of known size 200 on the image sensor 120 proportional in size to a known distance between two opposite ends of the object of known size (a) 200a, 200b, that distance forming the base 223 of a first isosceles triangle 220 where the sides of the first isosceles triangle (c) 221 will also be the hypotenuse (c) 221 of a right triangle, the length of that right triangle (b) 222 which is the sought distance to the object 225 and which would be calculated by $c^2 - 0.5a^2 = b^2$, this being a representation of the Pythagorean algorithm. The length of the hypotenuse (c) 221 can be calculated from a second proportional isosceles triangle 230 where the base of the second isosceles triangle (j) 233 is the length of the number of pixels 300 formed on the image sensor 120 of the object of known size 200 between the imaged two opposite ends (a) 200a, 200b and the distance between the sensor and the convergence point of the lens (k) 233, the hypotenuse of the second proportional hypotenuse (f) 231 being in pixels 300 calculated by $0.5j^2 + k^2 = l^2$. The distance between the two opposite ends of the object (a) 200a, 200b are converted to pixels 300 if measured directly on the image sensor 120, that conversion number then able to be used to calculate the distance to the object of known size 200 in the desired units of measure, typically the English or metric system, and, therefore, the unit of size represented by each pixel 300 on the image sensor, this being the equation:

$$\frac{x \text{ units of measure}}{1 \text{ Pixels}} \times n \text{ Pixels} = (a)$$

Figure 4A:
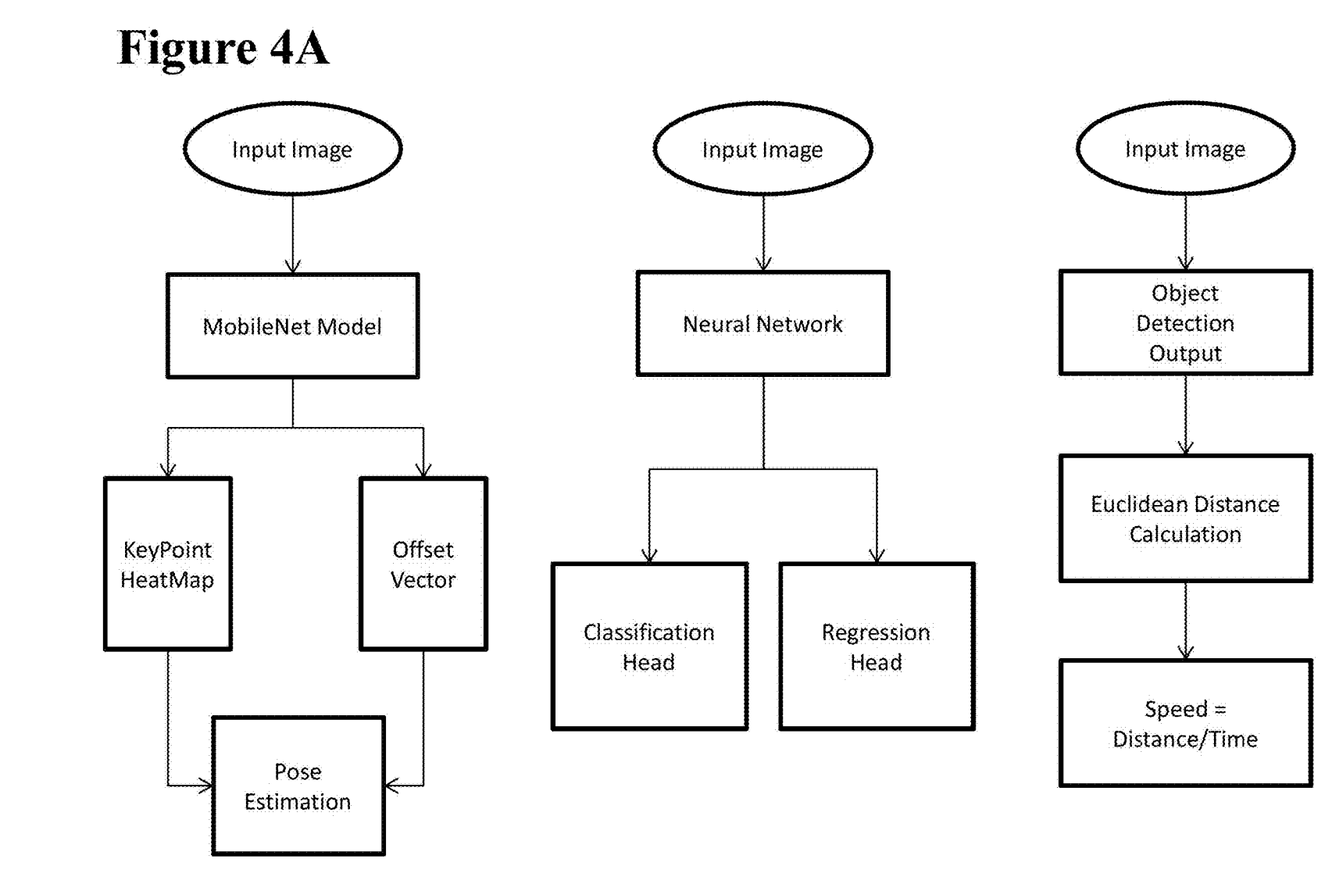
FIGS. 4A-4B illustrate elements of the image processing system.
Figure 4B:
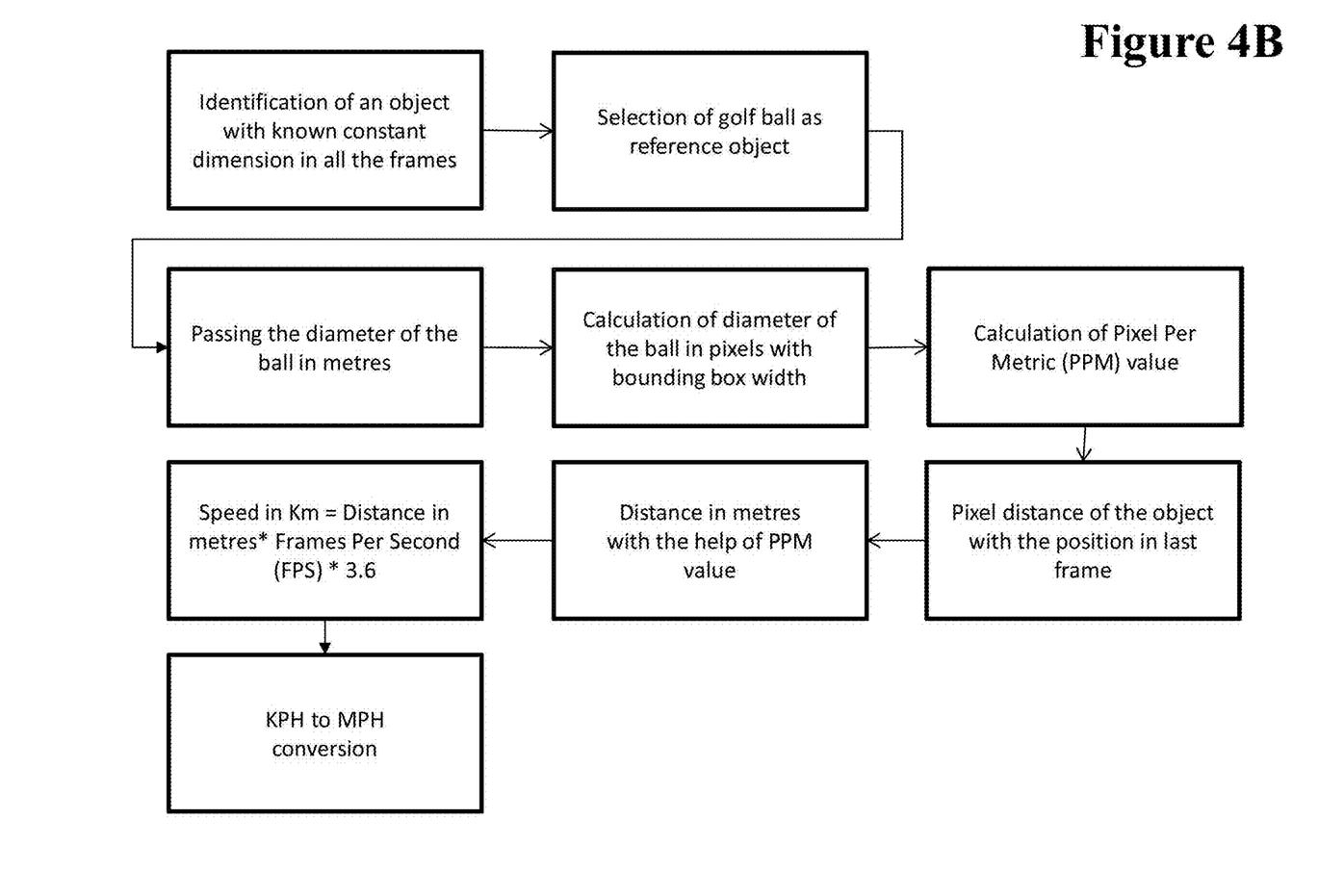
Figure 5:
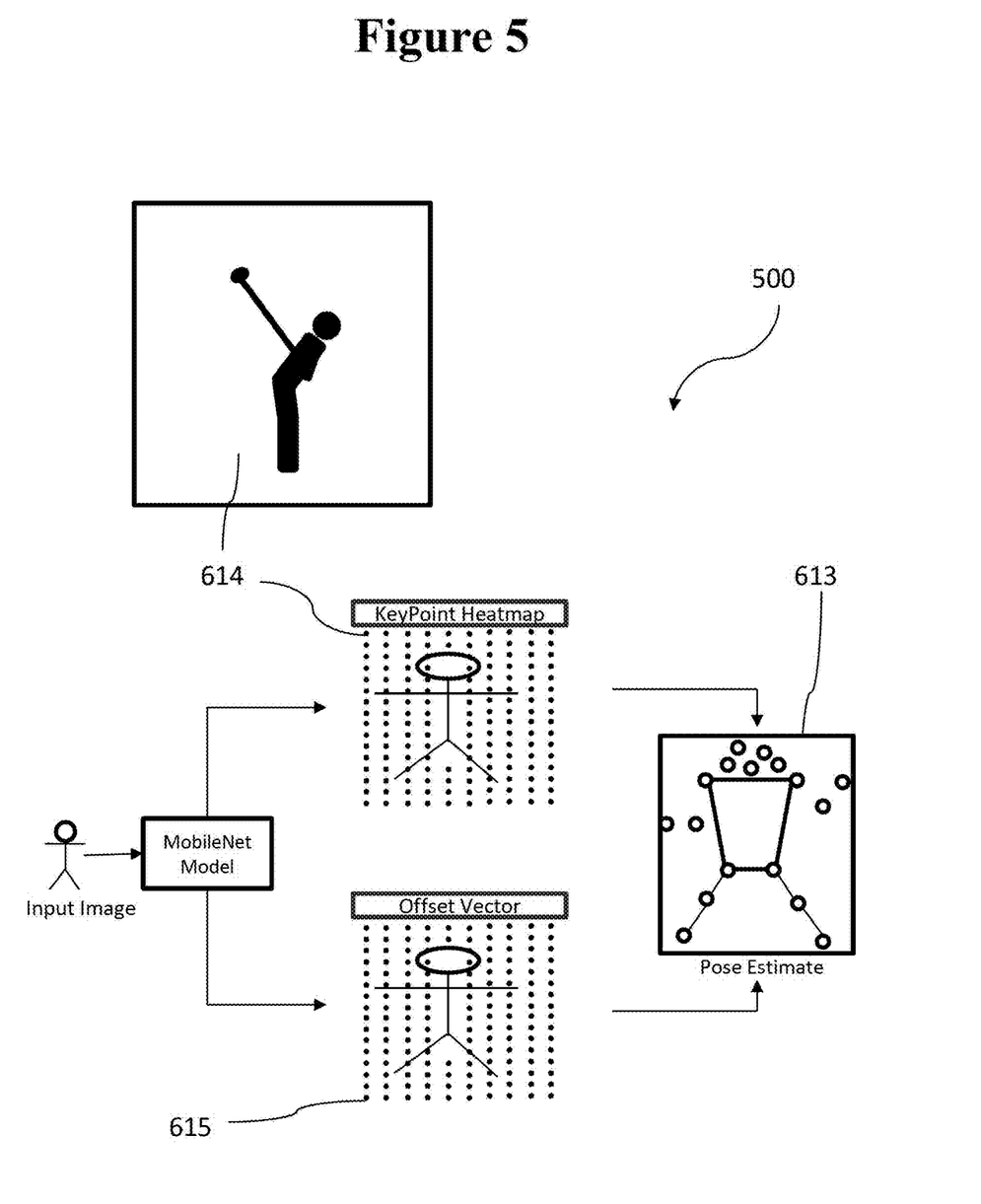
FIG. 5 illustrates the body frame pose estimator system.

FIGS. 1-8B, with reference to FIG. 4B, may convert distance calculations to speed by including the variable unit of time (t) to distance and location of the object of known size 200 or another object such as an element of the two or more rod points 630 or another object (not shown). Calculations of pixels 300 are converted per unit to measurement standards such as the metric system to create values such as pixels per meter (PPM). The variable unit of time is applied to changes in pixel 300 location based on changes of pixel 300 location per unit of frames per second and by derivatives of time to any desired point in the viewed three-dimensional space, including those angles that might increase or decrease distance as detected by a respectively decreasing or increasing pixel count of the object of known size 200 or other object. Furthermore, some offsets may be added to the algorithm if speed will distort the appearance of the object based on frame rate where pixel 300 blur can be estimated from speed or speed may be estimated from pixel 300 blur. For example, if the object of known size 200 is a substantially perfect sphere, and the imaged object appears on a given frame to take an elliptical shape, the added pixels displayed in the maximum diameter of the sphere can be factored out or used to aid in calculating speed, trajectory, or both. Other shapes may be considered. The changes by pixel 300 are converted to distance per frame per second and converted to the desired unit of measurement such as kilometers per hour or miles per hour. With reference to FIG. 8A, smash factor may be calculated from the two values of ball member speed and club speed where force imparted on the ball member is calculated by the mass and the acceleration of the club head upon impact, a sample calculation so illustrated in the figure.

FIGS. 1-8B further illustrate, the sports swing tracking system 10 also includes a body frame pose estimator program 400 of the at least one computer system 600 that has thirteen or more body frame points 613 detectable by at least one or more of offset vector calculations 614 and keypoint heatmapping 615, with reference to http://www.apsipa.org/proceedings/2020/pdfs/0001287.pdf. Keypoint heatmapping 615 involves estimating joint position based on heat profiles from player bodies under such items as garments, the garments often obscuring actual joint points representing the body frame points 613. Offset vector calculations 614 may also involve estimating point locations through obscuring clothing, equipment, and other obscuring items, and in both instances, calculations may include degrees of confidence in the accuracy of the estimates, the degrees of confidence further incorporated into machine learning algorithms to improve analysis performance.

FIGS. 1-8B further illustrate that the body frame pose estimator system 400 is designed to calculate the distance between each of the thirteen or more body frame points 613 from a pixel 300 measurement value determined by the distance to the object of known size 200, the object of known size 200 being within a useful proximity of the body frame points 613, useful proximity defined as a distance in which a person represented by the body frame points 613 can physically interact with the object of known size 200, the body frame pose estimator system 400 further designed to perform three-dimensional calculations from the thirteen or more body frame points 613 from which to estimate both location and point attitude.

FIGS. 1-8B further illustrate that the sports swing tracking system also includes a motion mapping program 500 of the at least one computer system 600 designed to calculate changes in the three-dimensional location and attitude of at least one or more of the thirteen or more body frame points 613, an at least one ball point 620 representing a ball, and two or more rod points 630 representing the at least one or more from a group of: bat, club, racket, stick, blade, paddle, foil, or other sports instrument having a handle portion and at least one or more of a striking, throwing, and catching portion, the motion mapping system 500 further calculating changes in point locations in three-dimensional space, where points include those denoted by 613, 620, and 630, from two or more frames 550 of known interval 551 and further deriving the rate of point location change between known intervals 551 from which to calculate speed and direction along the timeline between each frame 550 of the two or more frames 550 of known interval, the calculations including the location, speed, and direction at each selected derivative of time of the points in at least one or more of a defined three-dimensional space and three dimensional space relative to the other points, the general term points as defined here inclusive of the at least thirteen body frame points 613, the at least one ball point 620, and the two or more rod points 630.

Figure 1:
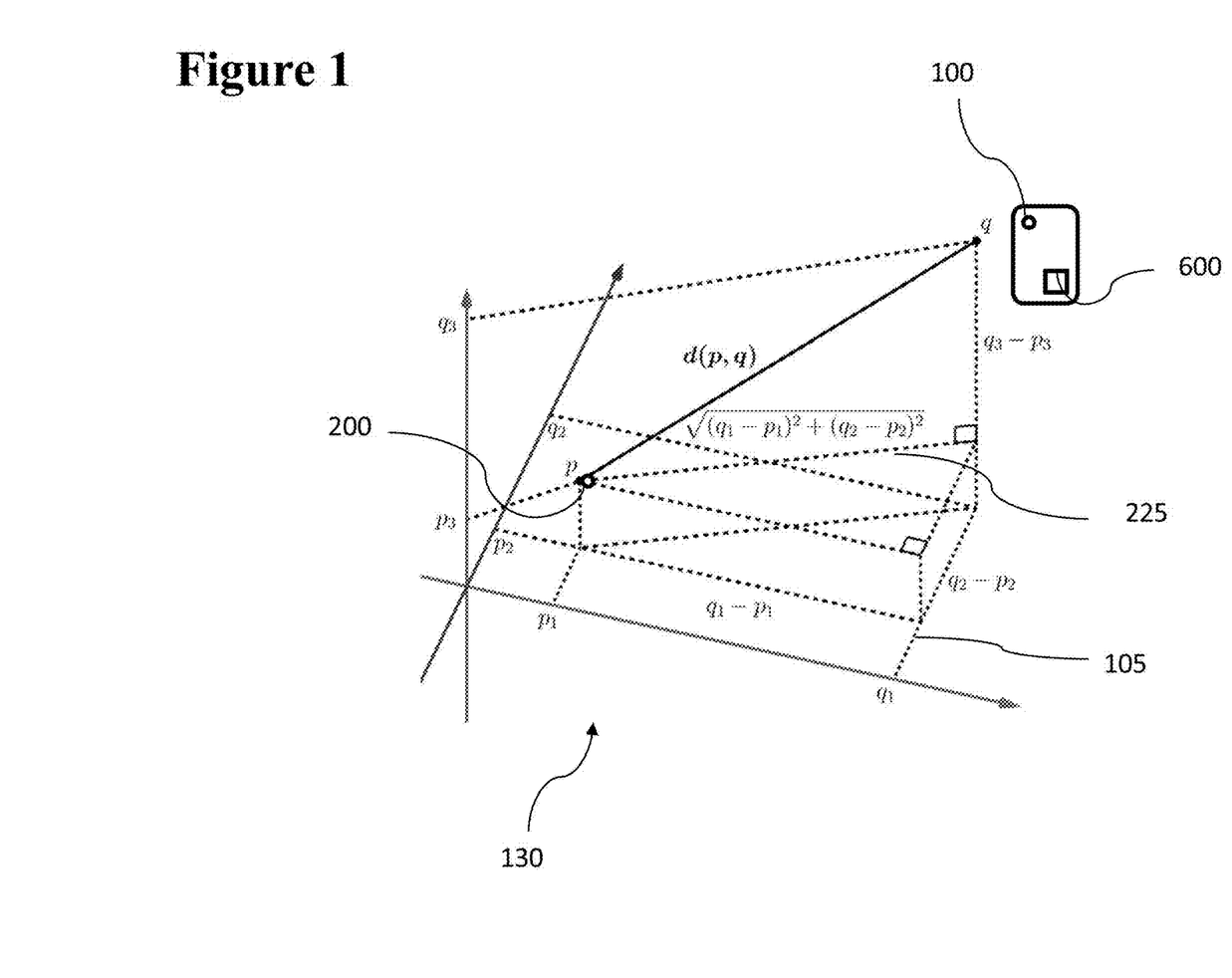
FIG. 1 illustrates the distance calculating system of the swing tracking system.
Figure 2:
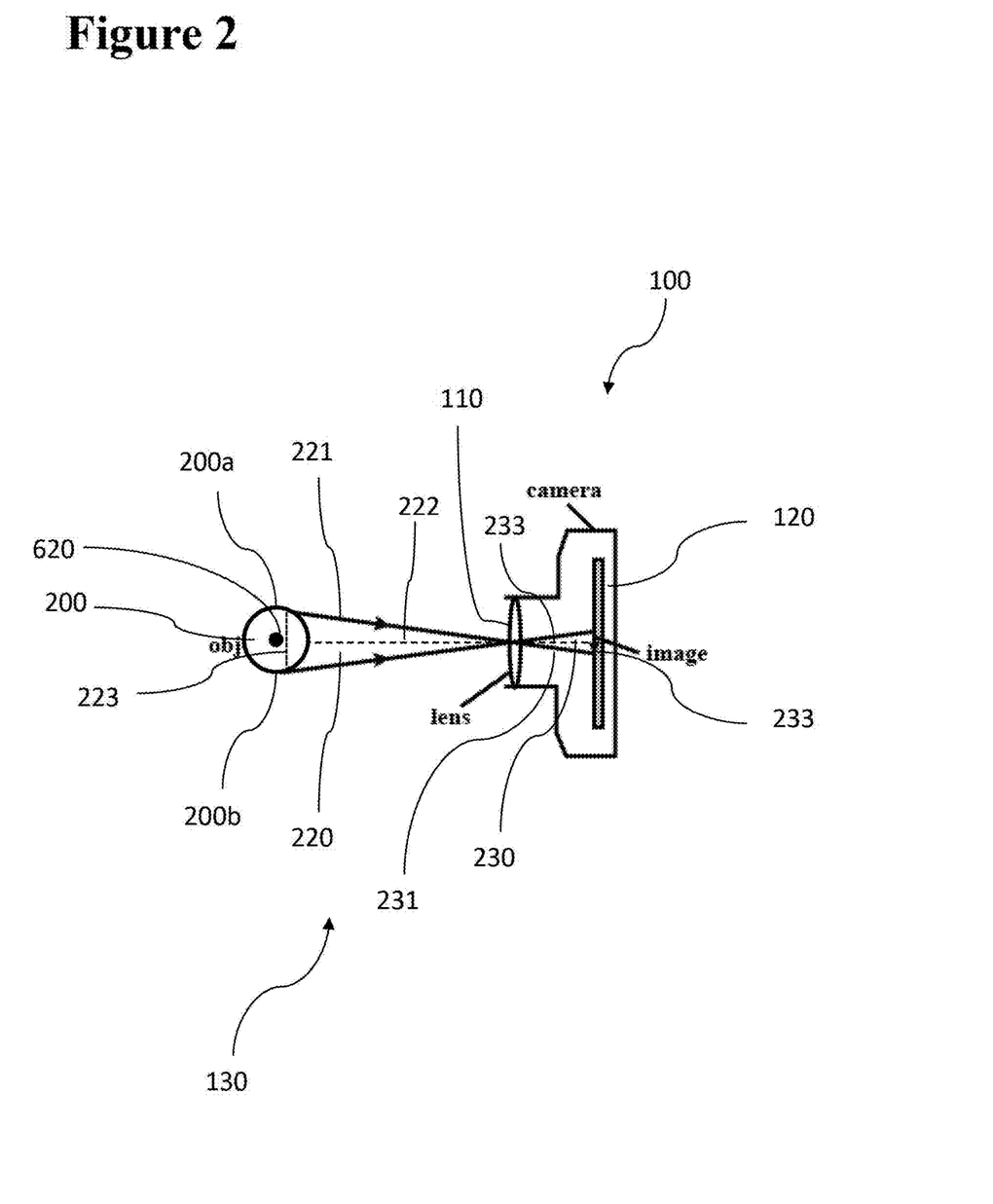
FIG. 2 further illustrates the distance calculating system of the swing tracking system.
Figure 3:
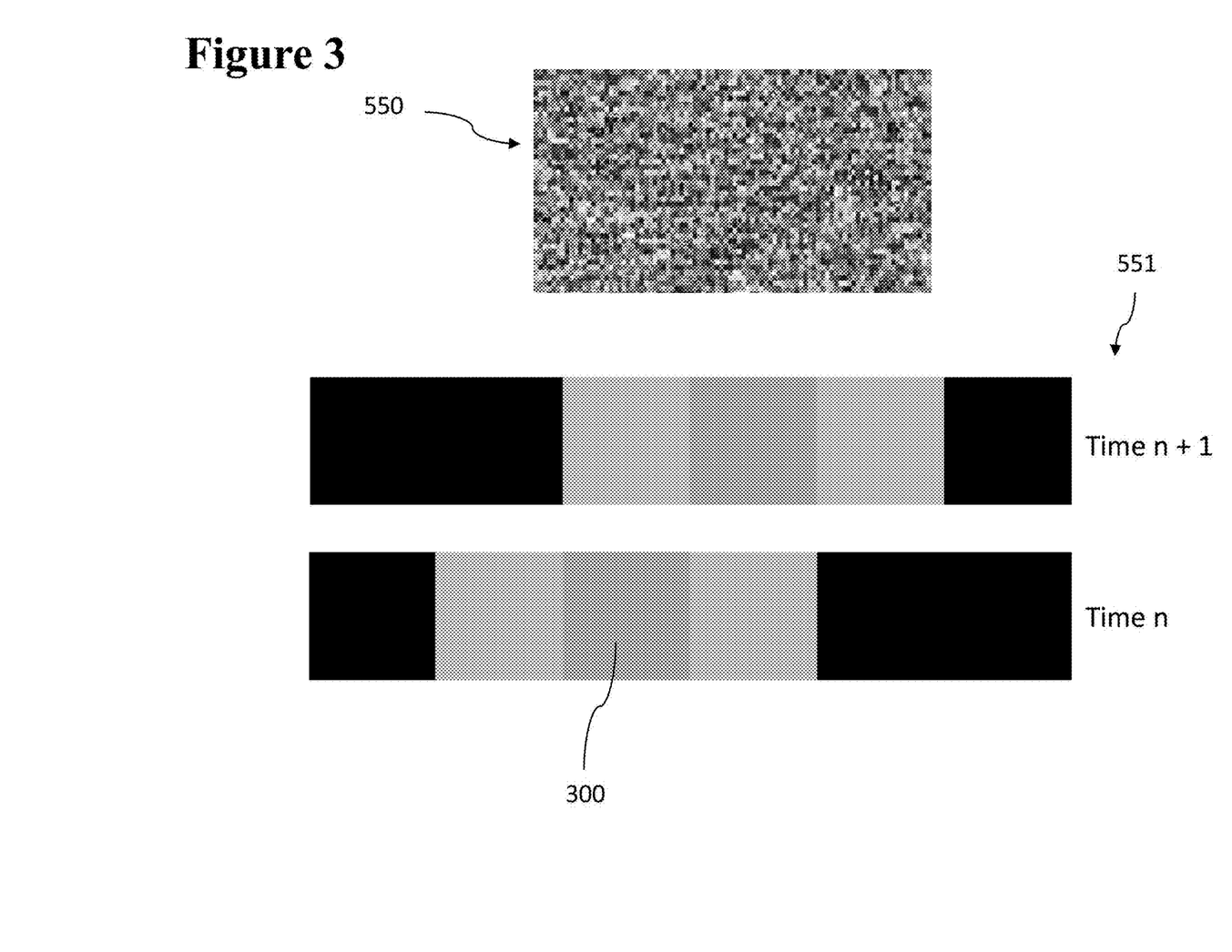
FIG. 3 illustrates an image frame and pixels.

In one embodiment of the sports swing tracking system 10, the distance calculating system 130 is designed to refine distance calculations based on the angle of each point from the camera system 100 wherein the maximum distance adjustment and minimum distance adjustment is determined by the height of the camera system 100 and the height of the object of known size 200, the height measured from a common horizontal plane 105.

In one embodiment of the sports swing tracking system, the distance calculating system 130 operates from a default setting of the camera system 100 being at substantially five feet and nine inches above the common horizontal plane 105, the height setting of the camera system being adjustable by a user. In one embodiment of the sports swing tracking system, the distance calculating system 130 includes at least one or more from a group of: a trigonometry-based optical distance measurement system, a laser-based measurement system, a sonar-based measurement system, and a GPS measurement system.

Figure 6:
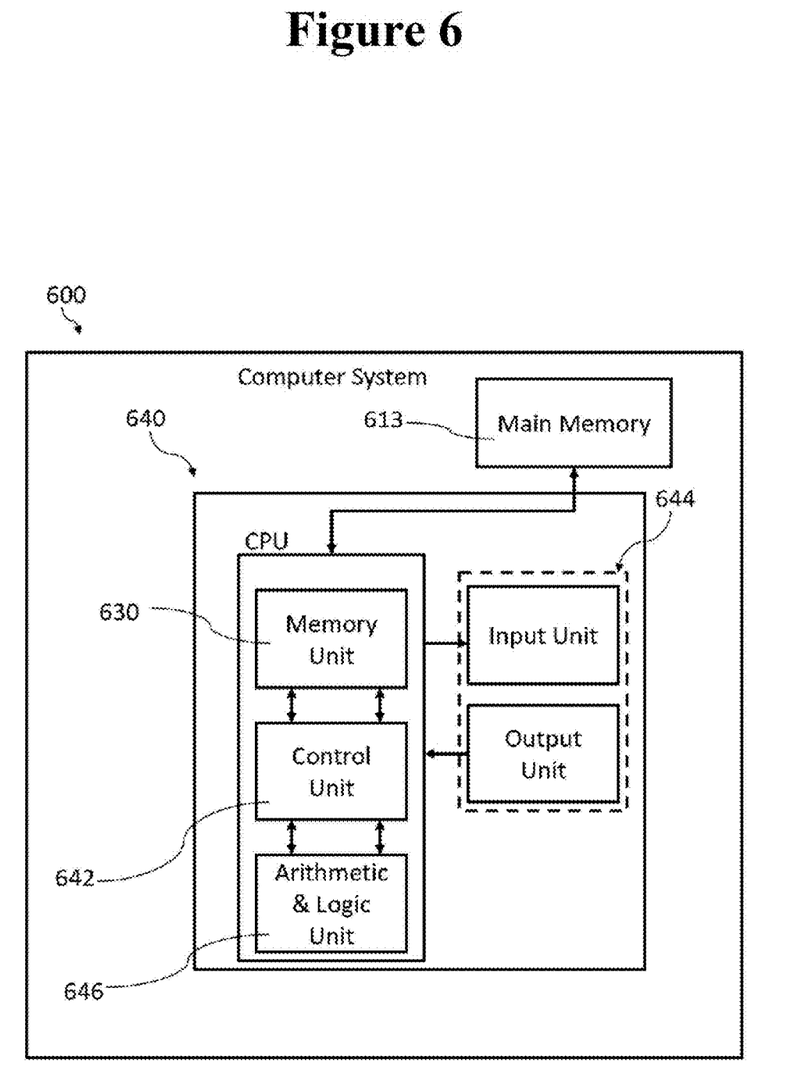
FIG. 6 illustrates the representative computer system.
Figure 7:
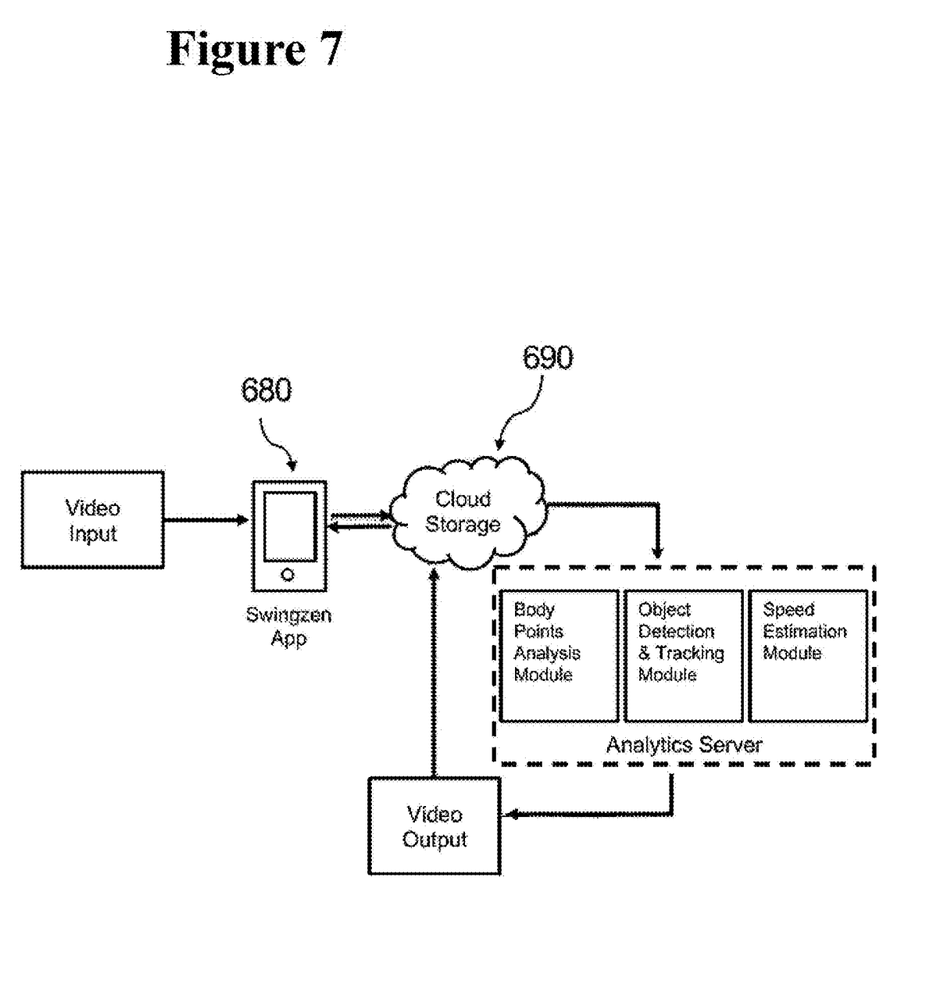
FIG. 7 illustrates the representative computer system link to a cloud system.
Figure 8A:
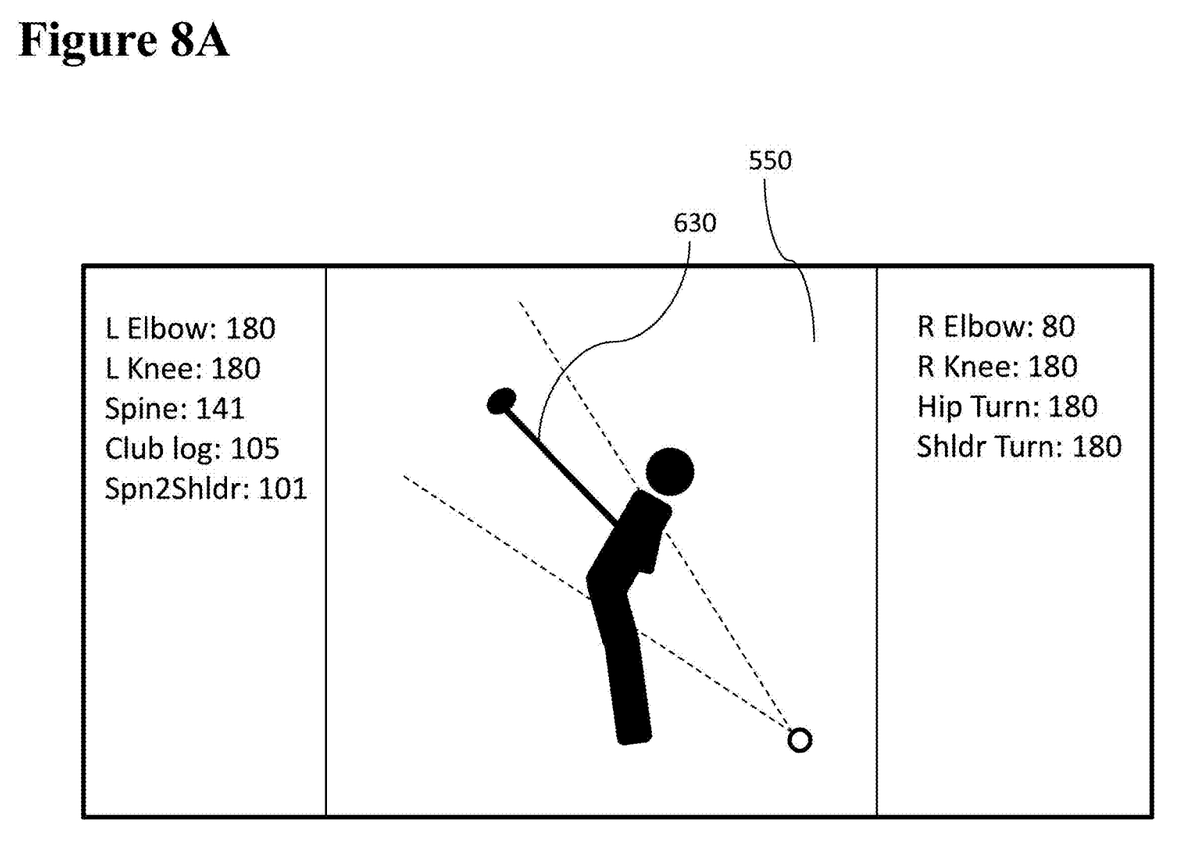
FIGS. 8A-8B illustrate image frames with annotated statistics.
Figure 8B:
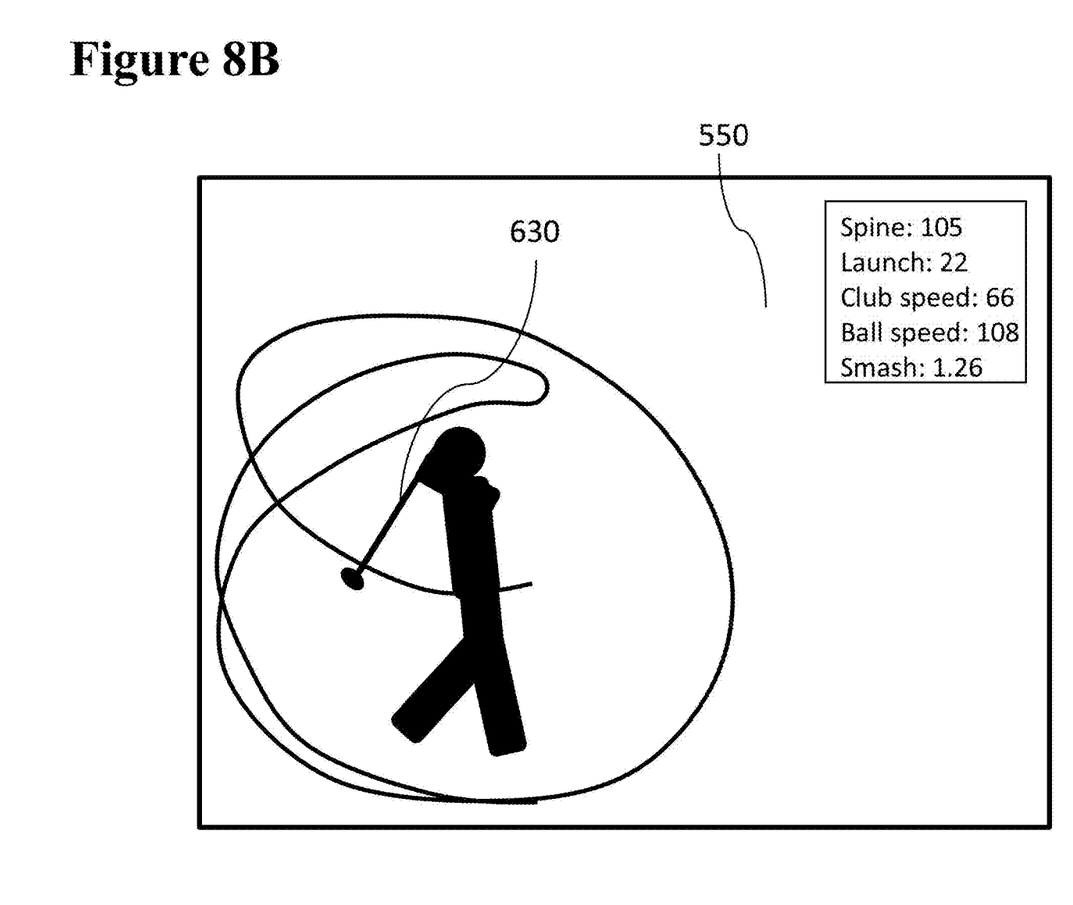

FIGS. 1-8B further illustrate, specific to FIG. 6, a central processing unit (CPU) 640, also called a central processor or main processor, and is the electronic circuitry within the representative at least one computer 600 that executes instructions that make up a computer program. The CPU 640 performs basic arithmetic, logic, controlling, and input/output (I/O) operations specified by the instructions in the program. An arithmetic & logic unit (ALU) 646 is a combination digital electronic circuit that performs arithmetic and bitwise operations in integer binary numbers. Traditionally, the term CPU 640 refers to a processor, more specifically to its processing unit and control unit (CU) 642, distinguishing these core elements of a computer from external components such as main memory 613 and input output (I/O) circuitry 644. A CPU 640 may also contain memory 630. Memory 630 refers to a component that is used to store for immediate use in a computer 600. Elements of the computer system 600 are located in at least one or more of a smartphone 680 and a cloud system 690 illustrated in this representative system.

The following patents are incorporated by reference in their entireties: U.S. Pat. Nos. 8,951,138, 10,953,303, and 6,929,558.

While the inventive concept has been described above in terms of specific embodiments, it is to be understood that the inventive concept is not limited to these disclosed embodiments. Upon reading the teachings of this disclosure, many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A sports swing tracking system comprising:
   at least one computer processor operable with a memory storage medium;
   a camera system having at least one convergent lens and at least one digital image sensor, the camera system operably coupled to the at least one computer processor, the camera system operating at or greater than sixty frames per second at an exposure rate of at or faster than one one-thousandth of a second;
   a distance calculating program operable by the at least one computer system adapted to calculate the distance to an object of known size from the camera system substantially when imaging the object, the calculation determined from at least one or more of a single row of pixels arrayed horizontally to determine width and a single row of pixels arrayed vertically to determine height corresponding to the equivalent dimensions of the imaged object of known size;
   a body frame pose estimator program operable by the at least one computer system having thirteen or more body frame points detectable by at least one or more of offset vector calculations and keypoint heatmapping, the body frame pose estimator program adapted to calculate the distance between each of the thirteen or more body frame points from a pixel measurement value determined by the distance to the object of known size, the object of known size being within a useful proximity of the body frame points, the body frame pose estimator system program further adapted to perform three-dimensional calculations from the thirteen or more body frame points from which to estimate both location and point attitude; and
   a motion mapping system program operable by of the at least one computer system adapted to calculate changes in the three-dimensional location and attitude of at least one or more of the thirteen or more body frame points, at least one ball point representing a ball, and two or more rod points representing at least one or more from a group of: bat, club, racket, stick, blade, paddle, foil, or other sports instrument having a handle portion and at least one or more of a striking, throwing, and catching portion, the motion mapping program further calculating changes in point locations in three-dimensional space from two or more frames of known interval and further deriving the rate of point location change between known intervals from which to calculate speed and direction along the timeline between each frame of the two or more frames of known interval, the calculations including the location, speed, and direction at each selected derivative of time of the points in at least one or more of a defined three-dimensional space and three dimensional space relative to the other points.

2. The sports swing tracking system of claim 1 wherein the distance calculating program is adapted to refine distance calculation based on the angle of each point from the camera system wherein the maximum distance adjustment and minimum distance adjustment is determined by the height of the camera system and the height of the object of known size, the height measured from a common horizontal plane.

3. The sports swing tracking system of claim 1 wherein the distance calculating program operates from a default setting of the camera system being at substantially five feet and nine inches above the common horizontal plane, the height setting of the camera system being adjustable by a user.

4. The sports swing tracking system of claim 1 wherein the distance calculating program includes at least one or more from a group of: a trigonometry-based optical distance measurement system, a laser-based measurement system, a sonar-based measurement system, and a GPS measurement system.

* * * * *